(12) United States Patent
Fujiwara et al.

(10) Patent No.: US 10,077,762 B2
(45) Date of Patent: Sep. 18, 2018

(54) POWER GENERATION DEVICE AND ROTATING PORTION SUPPORT STRUCTURE

(71) Applicant: JTEKT CORPORATION, Osaka-shi, Osaka (JP)

(72) Inventors: Hideki Fujiwara, Kitakatsuragi-gun (JP); Takeshi Takaki, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 363 days.

(21) Appl. No.: 14/894,838

(22) PCT Filed: Jun. 5, 2014

(86) PCT No.: PCT/JP2014/064992
§ 371 (c)(1),
(2) Date: Nov. 30, 2015

(87) PCT Pub. No.: WO2014/199901
PCT Pub. Date: Dec. 18, 2014

(65) Prior Publication Data
US 2016/0102655 A1    Apr. 14, 2016

(30) Foreign Application Priority Data
Jun. 10, 2013    (JP) .................... 2013-121924

(51) Int. Cl.
*F16D 41/064*    (2006.01)
*F16D 11/02*    (2006.01)
(Continued)

(52) U.S. Cl.
CPC ............. *F03D 11/02* (2013.01); *F03D 1/06* (2013.01); *F03D 7/028* (2013.01); *F03D 9/25* (2016.05);
(Continued)

(58) Field of Classification Search
CPC . F03D 9/25; F03D 80/70; F03D 15/00; F03D 7/028; F03D 1/06; Y02E 10/721;
(Continued)

(56) References Cited

U.S. PATENT DOCUMENTS

| 2010/0294585 A1 | 11/2010 | Wolff et al. |
| 2012/0184380 A1 | 7/2012 | Wolff et al. |

(Continued)

FOREIGN PATENT DOCUMENTS

| CN | 2448996 Y | 9/2001 |
| CN | 101349251 A | 1/2009 |

(Continued)

OTHER PUBLICATIONS

Oct. 31, 2017 Office Action issued in Chinese Patent Application No. 201480032595.7.
(Continued)

*Primary Examiner* — Ramya P Burgess
*Assistant Examiner* — Lillian T Nguyen
(74) *Attorney, Agent, or Firm* — Oliff PLC

(57) ABSTRACT

A power generation device includes a main shaft rotated by an external force, a speed-up gear, a high-speed shaft, a rolling bearing, a power generator, and a one-way clutch disposed between the output gear and the high-speed shaft. In a state where the main shaft is rotating in a positive direction, the one-way clutch integrally rotatably connects the output gear and the high-speed shaft to each other if a rotational speed of the output gear exceeds a rotational speed of the high-speed shaft, and breaks connection between the output gear and the high-speed shaft if the rotational speed of the output gear becomes lower than the rotational speed of the high-speed shaft.

11 Claims, 9 Drawing Sheets

(51) Int. Cl.

| | | |
|---|---|---|
| *F16D 41/067* | (2006.01) | |
| *F03D 11/02* | (2006.01) | |
| *F03D 15/10* | (2016.01) | |
| *F16D 41/07* | (2006.01) | |
| *F03D 1/06* | (2006.01) | |
| *F03D 7/02* | (2006.01) | |
| *F03D 80/70* | (2016.01) | |
| *F03D 15/00* | (2016.01) | |
| *F03D 9/25* | (2016.01) | |
| *F03D 80/80* | (2016.01) | |
| *F16D 41/06* | (2006.01) | |

(52) U.S. Cl.
CPC ............ *F03D 15/00* (2016.05); *F03D 15/10* (2016.05); *F03D 80/70* (2016.05); *F16D 41/067* (2013.01); *F16D 41/073* (2013.01); *F03D 80/88* (2016.05); *F16D 2041/0608* (2013.01); *Y02E 10/721* (2013.01)

(58) Field of Classification Search
CPC .... F16D 41/067; F16D 43/208; F16D 43/216; F16D 43/22; F16D 47/04
See application file for complete search history.

(56) References Cited

U.S. PATENT DOCUMENTS

| | | |
|---|---|---|
| 2012/0201679 A1 | 8/2012 | Heidenreich et al. |
| 2013/0043679 A1 | 2/2013 | Nomoto |
| 2013/0062886 A1 | 3/2013 | Fujiwara et al. |
| 2013/0283598 A1 | 10/2013 | Bowdich et al. |
| 2014/0079534 A1 | 3/2014 | Murphy |
| 2014/0090945 A1* | 4/2014 | Fujiwara ............... F16D 41/067 192/45.001 |
| 2015/0061436 A1 | 3/2015 | Fujiwara et al. |
| 2015/0114732 A1 | 4/2015 | Bowdich et al. |

FOREIGN PATENT DOCUMENTS

| | | |
|---|---|---|
| CN | 102966336 A | 3/2013 |
| EP | 2568197 A1 | 3/2013 |
| JP | 2006-307816 A | 11/2006 |
| JP | 2007-232186 A | 9/2007 |
| JP | 2011-256747 A | 12/2011 |
| JP | 2013-032789 A | 2/2013 |
| JP | 2013-060825 A | 4/2013 |
| JP | 2013-076395 A | 4/2013 |
| JP | 2013-110844 A | 6/2013 |
| WO | 2012-127196 A1 | 9/2012 |

OTHER PUBLICATIONS

Mar. 20, 2017 Extended European Search Report issued in Patent Application No. 14810496.1.
Aug. 19, 2014 Search Report issued in International Patent Application No. PCT/JP2014/064992.
Apr. 18, 2017 Office Action issued in Japanese Patent Application No. 2013-121924.
Jun. 15, 2018 Office Action issued in Chinese Patent Application No. 201480032595.7.
Yin, Dazhi; "Lawn Establishment and Maintenance Machinery;" 21 Higher Vocational Planning Materials Ministry of Agriculture Century Garden Machinery; pp. 157-158; Aug. 2007; 1st Edition.

* cited by examiner

POWER GENERATION DEVICE AND ROTATING PORTION SUPPORT STRUCTURE

TECHNICAL FIELD

One aspect of the present invention relates to a power generation device in which a power generator is driven by increasing, by a speed-up gear, the speed of rotation of a main shaft caused by an external force, and a rotating portion support structure used in the power generation device.

BACKGROUND ART

Some of wind power generation devices for generating electric power by rotating a main shaft with wind received by a blade are equipped with a speed-up gear. The speed-up gear increases the speed of the rotation of the main shaft to drive a power generator.

As illustrated in FIG. 9, a speed-up gear 202 includes a planetary gear mechanism 203 that receives the rotation of a main shaft 200 to increase its speed; and a high-speed stage gear mechanism 204 that receives the rotation increased in speed by the planetary gear mechanism 203 to further increase its speed. Besides, a high-speed shaft 205 for outputting the rotation increased in speed by the high-speed stage gear mechanism 204 is provided, and this high-speed shaft 205 is connected to a drive shaft (not shown) of a power generator, and a rotor of the power generator is attached to this drive shaft.

In the planetary gear mechanism 203, when an input shaft 203a integrally rotatably connected to the main shaft 200, to which a blade not shown is attached, is rotated, a planetary carrier 203b is rotated to rotate a sun gear 203d at an increasing speed via a planetary gear 203c. Then, this rotation is transmitted to a low-speed shaft 204a of the high-speed stage gear mechanism 204.

In the high-speed stage gear mechanism 204, when the low-speed shaft 204a is rotated, an intermediate shaft 204d is rotated at an increasing speed via a low-speed gear 204b and a first intermediate gear 204c, and the high-speed shaft 205 is rotated at an increasing speed further via a second intermediate gear 204e and an output gear 204f.

Besides, as bearings for rotatably supporting the low-speed shaft 204a, the intermediate shaft 204d and the high-speed shaft 205 in the speed-up gear 202, rolling bearings (roller bearings) 206 to 211 are frequently used (see, for example, Patent Document 1).

RELATED ART DOCUMENTS

Patent Documents

Patent Document 1: JP-A-2007-232186

SUMMARY OF THE INVENTION

Problem to be Solved by the Invention

In the wind power generation device illustrated in FIG. 9, in the rolling bearings (roller bearings) 210 and 211 supporting the high-speed shaft 205 rotating at a high speed, smearing (a phenomenon in which a seizure is caused in a surface layer) occurs on a rolling contact surface of a rolling element (a roller) or a raceway surface of a turning wheel, which causes a problem in which the lifetime of the rolling bearings 210 and 211 is reduced.

Incidentally, it is presumed that such smearing similarly occurs in a rolling bearing (roller bearing) provided not only in a wind power generation device but also in another type of power generation device in which the rotation of a main shaft is increased in speed by a speed-up gear to drive a power generator.

Therefore, an object of one aspect of the present invention is to provide a power generation device in which the occurrence of smearing in a rolling bearing supporting a high-speed shaft rotating at a speed increased by a speed-up gear can be suppressed, and a rotating portion support structure used in the power generation device.

Means for Solving the Problem

The present inventors have made earnest studies on the occurrence mechanism of smearing. As a result, the following has been found: When the rotational speed of a main shaft is abruptly lowered due to the lowering of an external force (a wind force), what is called a torque loss (a load loss) is caused on a high-speed shaft because the rotational speed of a drive shaft of a power generator rotating integrally with a rotor is to exceed the rotational speed of the high-speed shaft rotating at a speed increased by a speed-up gear owing to the inertia of the rotor of the power generator having a large weight. Because of this torque loss, in a rolling bearing supporting the high-speed shaft, the sliding frictional resistance and the like between a rolling element and a cage holding the rolling element become larger than the rolling frictional resistance between the rolling element and a turning wheel, and as a result, the rotation of the rolling element is delayed. When the rotational speed of the main shaft is abruptly increased from this state due to the increase of the external force (the wind force), an inertia torque of the rotor is applied to the high-speed shaft to abruptly increase a radial load applied to the rolling bearing supporting the high-speed shaft. Therefore, at that moment (in a transient state), a slip is caused between the rolling element and the turning wheel with the high load applied to the rolling element, which increases the temperature of a contact surface between the rolling element and the turning wheel, and this is the cause of the smearing. On the basis of this finding, the present invention was accomplished.

(1) Specifically, a first aspect of the present invention includes a power generation device including: a main shaft rotated by an external force; a speed-up gear including a rotation transmission mechanism that increases a speed of rotation of the main shaft, and an output gear that outputs the rotation increased in speed by the rotation transmission mechanism; a high-speed shaft that is rotatable by receiving a rotational force of the output gear; a rolling bearing that rotatably supports the high-speed shaft; a power generator which includes a drive shaft that rotates by receiving rotation of the high-speed shaft and a rotor that rotates integrally with the drive shaft, and which generates electric power in accordance with rotation of the rotor; and a one-way clutch that is disposed between the output gear and the high-speed shaft, and in a state where the main shaft is rotating in a positive direction, integrally rotatably connects the output gear and the high-speed shaft to each other if a rotational speed of the output gear exceeds a rotational speed of the high-speed shaft, and breaks connection between the output gear and the high-speed shaft if the rotational speed of the output gear becomes lower than the rotational speed of the high-speed shaft.

According to the first aspect of the present invention, when the rotational speed of the output gear exceeds the rotational speed of the high-speed shaft, the output gear and the high-speed shaft are integrally rotatably connected to each other by the one-way clutch provided between the output gear of the speed-up gear and the high-speed shaft, and thus, power is transmitted from the output gear to the high-speed shaft and the drive shaft. As a result, the drive shaft and the rotor are rotated to generate electric power.

On the contrary, when the rotational speed of the output gear becomes lower than the rotational speed of the high-speed shaft, the connection (power transmission) between the output gear and the high-speed shaft is broken. Accordingly, even if the rotational speed of the main shaft is abruptly lowered due to the lowering of the external force and hence the rotational speed of the output gear is abruptly lowered, the high-speed shaft is inertially rotated together with the rotor and the drive shaft of the power generator, and thus, an abrupt torque loss is prevented, and the rotation delay of a rolling element of the rolling bearing supporting the high-speed shaft can be suppressed. Therefore, even when the rotational speed of the main shaft is abruptly increased from this state due to a change of the external force and the output gear and the high-speed shaft are connected to each other to rotate the high-speed shaft by the rotational force received from the output gear, the rolling element is difficult to slip on a contact surface with a turning wheel in the rolling bearing supporting the high-speed shaft, and thus, occurrence of smearing in the rolling bearing can be suppressed.

(2) Preferably, in the power generation device according to (1) described above, the output gear is a ring-shaped gear which is provided coaxially with the high-speed shaft on an outer circumferential side of the high-speed shaft such that the one-way clutch is sandwiched by the ring gear and the high-speed shaft, and the one-way clutch includes a first clutch section provided on an inner circumferential side of the output gear and rotating integrally with the output gear, a second clutch section rotating integrally with the high-speed shaft, and an engaging element disposed between the pair of clutch sections.

In this case, the one-way clutch can be provided inside along a radial direction of the output gear.

(3) Furthermore, a second aspect of the present invention includes a power generation device including: a main shaft rotated by an external force; a speed-up gear including a rotation transmission mechanism that increases a speed of rotation of the main shaft, and an output gear that outputs the rotation increased in speed by the rotation transmission mechanism; a high-speed shaft that is rotatable by receiving a rotational force of the output gear; a rolling bearing that rotatably supports the high-speed shaft; and a power generator which includes a drive shaft that rotates by receiving rotation of the high-speed shaft and a rotor that rotates integrally with the drive shaft, and which generates electric power in accordance with rotation of the rotor, wherein the high-speed shaft includes a first shaft section that rotates integrally with the output gear, a second shaft section supported by the rolling bearing, and a connecting section provided between the first shaft section and the second shaft section, and wherein the connecting section is a one-way clutch, and in a state where the main shaft is rotating in a positive direction, the one-way clutch integrally rotatably connects the first shaft section and the second shaft section to each other if a rotational speed of the first shaft section exceeds a rotational speed of the second shaft section, and breaks connection between the first shaft section and the second shaft section if the rotational speed of the first shaft section becomes lower than the rotational speed of the second shaft section.

According to the second aspect of the present invention, in the high-speed shaft, when the rotational speed of the first shaft section rotating integrally with the output gear of the speed-up gear becomes lower than the rotational speed of the second shaft section, the connection (power transmission) between the first shaft section and the second shaft section is broken by the one-way clutch. Accordingly, even if the rotational speed of the main shaft is abruptly lowered due to the lowering of the external force and hence the rotational speed of the output gear and the first shaft section is abruptly lowered, the second shaft section is inertially rotated, and thus, an abrupt torque loss is prevented, and the rotation delay of a rolling element of the rolling bearing supporting the high-speed shaft (the second shaft section) can be suppressed. Therefore, even when the rotational speed of the main shaft is abruptly increased from this state due to a change of the external force and the first shaft section and the second shaft section are connected to each other to rotate the second shaft section by the rotational force received from the first shaft section, the rolling element is difficult to slip on a contact surface with a turning wheel in the rolling bearing supporting the second shaft section, and thus, the occurrence of smearing in the rolling bearing can be suppressed.

(4) Preferably, in the power generation device according to (3) described above, one of the first shaft section and the second shaft section includes a cylindrical portion located at a shaft end thereof, and the other of the first shaft section and the second shaft section includes a center shaft portion located at a shaft end thereof and disposed on a radially inner circumferential side of the cylindrical portion, and the one-way clutch includes a first clutch section that is provided inside the cylindrical portion and that rotates integrally with the cylindrical portion, a second clutch section that rotates integrally with the center shaft portion, and an engaging element provided between the pair of clutch sections.

In this case, the one-way clutch can be provided as a part of the high-speed shaft.

(5) Preferably, in the power generation device according to (2) or (4) described above, the one-way clutch further includes a clutch rolling bearing section that relatively rotatably supports the first clutch section and the second clutch section.

In this case, the first clutch section and the second clutch section are aligned along the radial direction by the clutch rolling bearing section.

(6) Preferably, in the power generation device according to (5) described above, the clutch rolling bearing section includes an outer ring portion, an inner ring portion and a cylindrical roller that is disposed between the outer ring portion and the inner ring portion and that rolls on an inner circumferential surface of the outer ring portion and an outer circumferential surface of the inner ring portion, and the first clutch section and the second clutch section are relatively movable along an axial direction.

In this case, since the first clutch section and the second clutch section are relatively movable along the axial direction, even if the high-speed shaft expands/contracts due to a temperature change, the expansion/contraction can be cancelled, and hence, the occurrence of a large thermal stress in the high-speed shaft and the like can be prevented.

(7) Preferably, in the power generation device according to (4) described above, relative movement of the first clutch section and the second clutch section along an axial direction is allowed, and a maximum allowable amount of the relative movement is set to be larger than amounts of movement along the axial direction of the first shaft section and the second shaft section.

In this case, since the first clutch section and the second clutch section are relatively movable along the axial direction, even if the high-speed shaft expands/contracts due to a temperature change, the expansion/contraction can be cancelled, and hence, the occurrence of a large thermal stress in the high-speed shaft can be prevented.

(8) Besides, a third aspect of the present invention includes a rotating portion support structure for a power generation device, the power generation device including: a speed-up gear including a rotation transmission mechanism that increases a speed of rotation of a main shaft rotated by an external force, and an output gear that outputs the rotation increased in speed by the rotation transmission mechanism; and a power generator which includes a drive shaft that rotates by receiving an output from the speed-up gear and a rotor that rotates integrally with the drive shaft, and which generates electric power in accordance with rotation of the rotor, the rotating portion support structure including: a high-speed shaft that is rotatable by receiving a rotational force of the output gear and that transmits the rotational force to the drive shaft; a rolling bearing that rotatably supports the high-speed shaft; and a one-way clutch that is provided between the output gear and the high-speed shaft, and in a state where the main shaft is rotating in a positive direction, integrally rotatably connects the output gear and the high-speed shaft to each other if a rotational speed of the output gear exceeds a rotational speed of the high-speed shaft, and breaks connection between the output gear and the high-speed shaft if the rotational speed of the output gear becomes lower than the rotational speed of the high-speed shaft.

According to the third aspect of the present invention, the same effects as those of the power generation device of (1) described above can be attained.

(9) Furthermore, a fourth aspect of the present invention includes a rotating portion support structure for a power generation device, the power generation device including: a speed-up gear including a rotation transmission mechanism that increases a speed of rotation of a main shaft rotated by an external force, and an output gear that outputs the rotation increased in speed by the rotation transmission mechanism; and a power generator which includes a drive shaft that rotates by receiving an output from the speed-up gear and a rotor that rotates integrally with the drive shaft, and which generates electric power in accordance with rotation of the rotor, the rotating portion support structure including: a high-speed shaft that is rotatable by receiving a rotational force of the output gear and that transmits the rotational force to the drive shaft; and a rolling bearing that rotatably supports the high-speed shaft, wherein the high-speed shaft includes a first shaft section that rotates integrally with the output gear, a second shaft section supported by the rolling bearing, and a connecting section provided between the first shaft section and the second shaft section, and wherein the connecting section is a one-way clutch, and in a state where the main shaft is rotating in a positive direction, the one-way clutch integrally rotatably connects the first shaft section and the second shaft section to each other if a rotational speed of the first shaft section exceeds a rotational speed of the second shaft section, and breaks connection between the first shaft section and the second shaft section if the rotational speed of the first shaft section becomes lower than the rotational speed of the second shaft section.

According to the fourth aspect of the present invention, the same effects as those of the power generation device of (3) described above can be attained.

Advantages of the Invention

According to a power generation device and a rotating portion support structure according to an aspect of the present invention, the occurrence of smearing in a rolling bearing supporting a high-speed shaft rotating at a speed increased by a speed-up gear can be suppressed.

MODE FOR CARRYING OUT THE INVENTION

An embodiment of the present invention will now be described.

Figure 1:
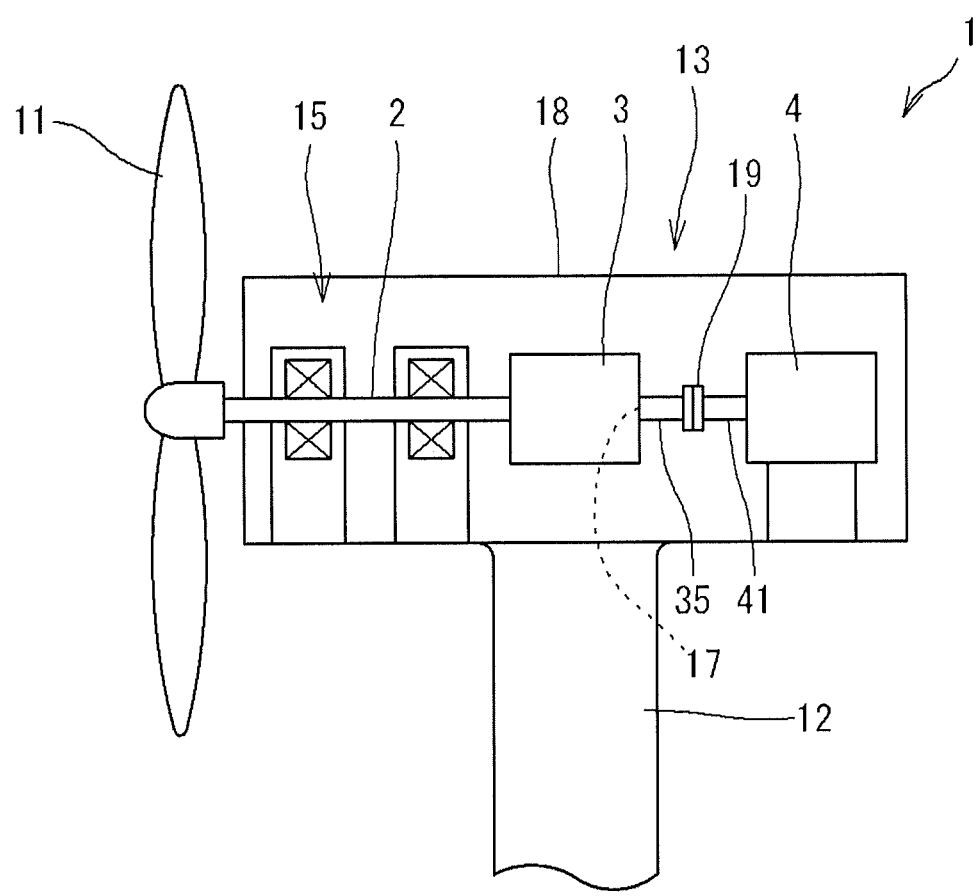
FIG. 1 is a schematic side view illustrating a power generation device according to an embodiment of the present invention.

FIG. 1 is a schematic side view of a power generation device according to one embodiment of the present invention. The power generation device of the present embodiment is a wind power generation device including a main shaft 2 rotated by a wind force (an external force). The wind power generation device 1 includes a blade (a wind receiving member) 11, a column 12 and a nacelle 13. The blade 11 includes a plurality of wings provided at the tip of the main shaft 2, and rotates the main shaft 2 by receiving wind. The nacelle 13 includes the main shaft 2; a support mechanism 15 for supporting the main shaft 2; a speed-up gear 3 for increasing the speed of the rotation of the main shaft 2; a rotating portion support structure 17 including a high-speed shaft 35 rotating at a high speed by receiving an output of the speed-up gear 3, a bearing supporting the high-speed shaft 35, and the like; a power generator 4 for generating electric power by using a rotational force supplied from the high-speed shaft 35; a casing 18 for housing these components, and the like. The column 12 supports the nacelle 13 horizontally rotatably around a vertical axis.

Figure 2:
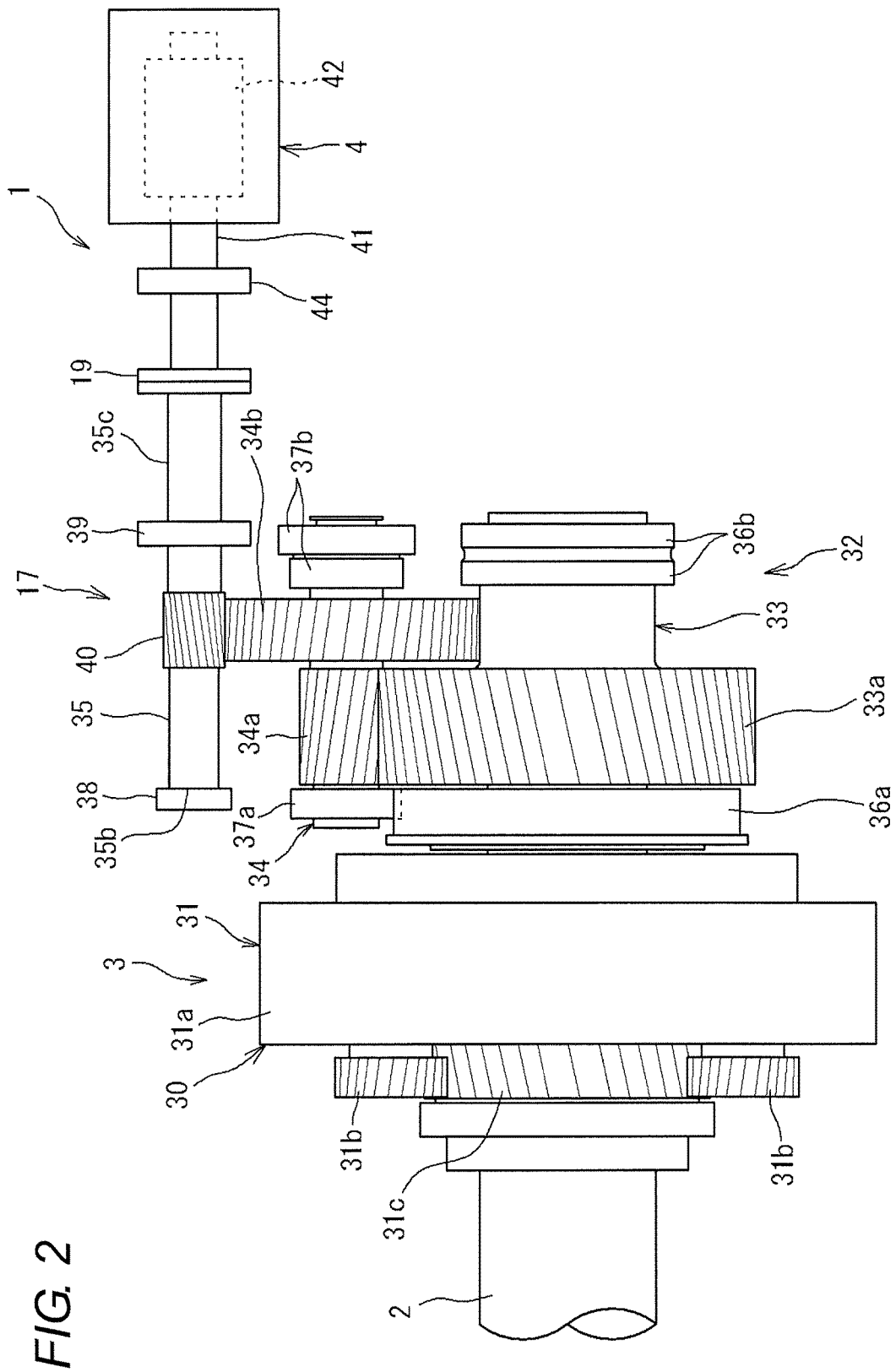
FIG. 2 is a schematic side view illustrating a speed-up gear, a rotating portion support structure and a power generator.

FIG. 2 is a schematic side view of the speed-up gear 3, the rotating portion support structure 17 and the power generator 4. The power generator 4 is formed by, for example, an induction generator, and includes a drive shaft 41 that is rotated by receiving the rotation of the high-speed shaft 35, having been increased in speed by the speed-up gear 3, a rotor 42 built in the power generator 4, and a stator and the like not shown. The rotor 42 is integrally rotatably connected to the drive shaft 41, and the power generator 4 generates electric power as a result of driving the rotor 42 by the rotation of the drive shaft 41. Besides, the power generator 4 includes a brake 44 for braking the drive shaft 41. The brake 44 can restrict the rotation of the drive shaft 41.

The speed-up gear 3 includes a gear mechanism (rotation transmission mechanism) 30 that receives the rotation of the main shaft 2 to increase the speed of the rotation. The gear mechanism 30 includes a planetary gear mechanism 31, and a high-speed stage gear mechanism 32 that receives the rotation having been increased in speed by the planetary gear mechanism 31 to further increase its speed.

The planetary gear mechanism 31 includes an internal gear (a ring gear) 31a, a plurality of planetary gears 31b held on a planetary carrier (not shown) integrally rotatably connected to the main shaft 2, and a sun gear 31c engaged with the planetary gears 31b. Thus, when the planetary carrier is rotated together with the main shaft 2, the sun gear 31c is rotated via the planetary gears 31b, and the rotation is transmitted to a low-speed shaft 33 of the high-speed stage gear mechanism 32.

The high-speed stage gear mechanism 32 includes the low-speed shaft 33 having a low-speed gear 33a, an intermediate shaft 34 having a first intermediate gear 34a and a second intermediate gear 34b, and an output gear 40.

The low-speed shaft 33 is formed by a large rotating shaft having a diameter of, for example, about 1 m, and is disposed coaxially with the main shaft 2. Both end portions along the axial direction of the low-speed shaft 33 are rotatably supported by rolling bearings (roller bearings) 36a and 36b.

The intermediate shaft 34 is disposed in the vicinity of the low-speed shaft 33, and both end portions thereof along the axial direction are rotatably supported by rolling bearings (roller bearings) 37a and 37b. The first intermediate gear 34a of the intermediate shaft 34 is engaged with the low-speed gear 33a, and the second intermediate gear 34b is engaged with the output gear 40. The output gear 40 outputs the rotation increased in speed by the aforementioned gear mechanism (the rotation transmission mechanism) 30.

The high-speed shaft 35 is disposed in the vicinity of the intermediate shaft 34, and is capable of rotating by receiving the output of the output gear 40 and outputting a running torque. The high-speed shaft 35 is rotatably supported, at a first end portion 35b and a second end portion 35c thereof along the axial direction, respectively by rolling bearings (38 and 39). The high-speed shaft 35 and the drive shaft 41 are connected to each other by a joint 19, so as to be capable of mutually transmitting power.

Owing to the above-described structure, the speed of the rotation of the main shaft 2 is increased in three stages by a gear ratio of the planetary gear mechanism 31, a gear ratio between the low-speed gear 33a and the first intermediate gear 34a, and a gear ratio between the second intermediate gear 34b and the output gear 40, so that the running torque can be output from the output end portion 35c of the high-speed shaft 35. In other words, the rotation of the main shaft 2 caused by a wind force is increased in speed in three stages by the speed-up gear 3 to drive the power generator 4.

Figure 3:
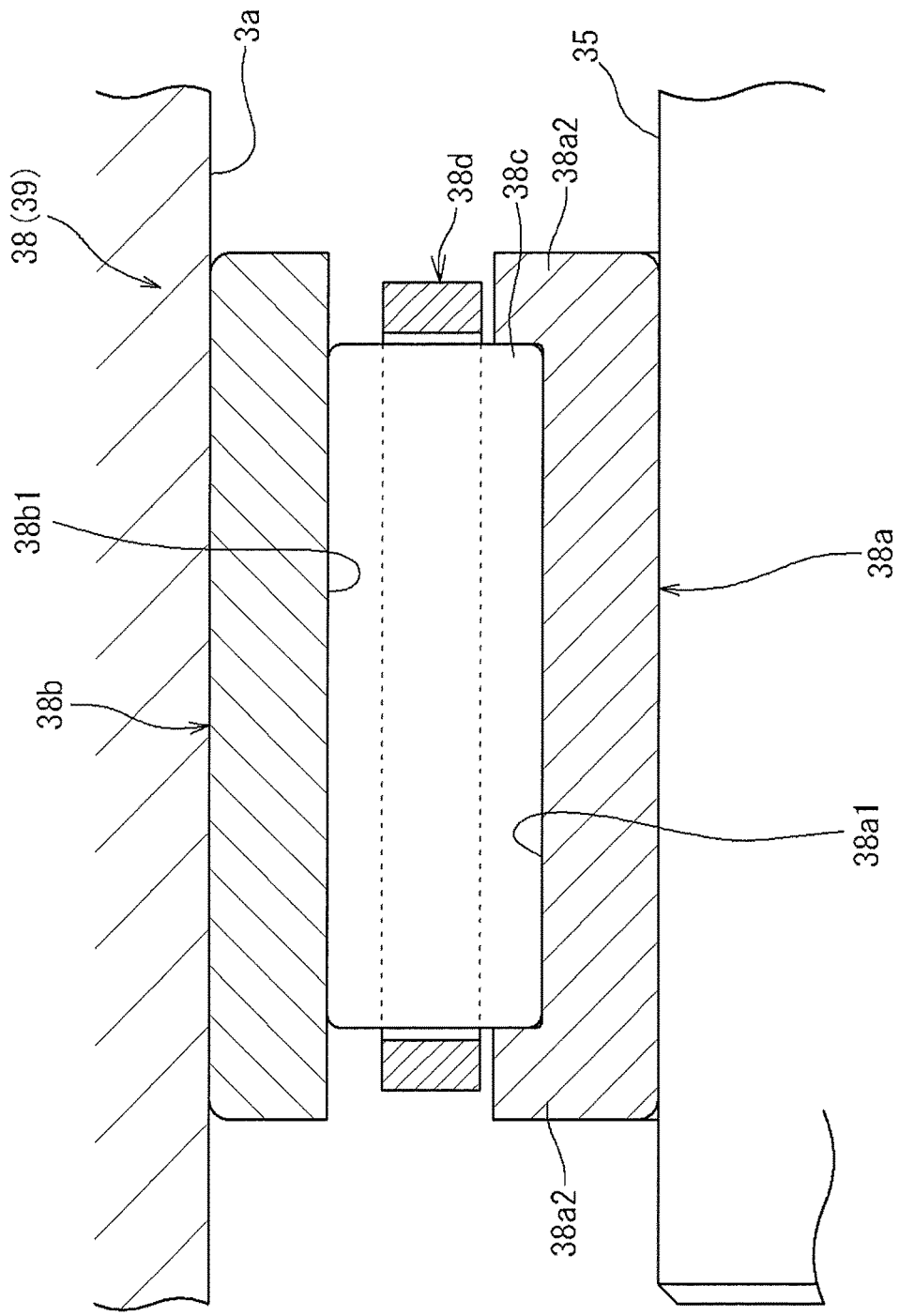
FIG. 3 is a cross-sectional view of a rolling bearing rotatably supporting a high-speed shaft.

FIG. 3 is a cross-sectional view of the rolling bearing (38 or 39) rotatably supporting the high-speed shaft 35. In the present embodiment, each of these rolling bearings (38 and 39) is a roller bearing formed particularly by a cylindrical roller bearing. The roller bearing 38 and the roller bearing 39 have the same structure, and hence the roller bearing 38 will be representatively described herein.

The roller bearing 38 includes an inner ring 38a externally fit and fixed on the high-speed shaft 35, an outer ring 38b fixed on a housing 3a of the speed-up gear 3, a plurality of rollers 38c disposed to be movable by rolling between the inner ring 38a and the outer ring 38b, and a ring-shaped cage 38d for holding the respective rollers 38c at prescribed intervals along the circumferential direction. The inner ring 38a, the outer ring 38b and the rollers 38c are made of, for example, bearing steel, and the cage 38d is made of, for example, a copper alloy.

The inner ring 38a has an inner ring raceway surface 38a1 formed in a center portion along the axial direction on the outer circumference thereof. Besides, the inner ring 38a has a pair of outer ring flange portion 38a2 formed on both sides along the axial direction. The outer ring 38b is disposed coaxially with the inner ring 38a, and includes an outer ring raceway surface 38b1 formed in a center portion along the axial direction on the inner circumference thereof. The outer ring raceway surface 38b1 is disposed to oppose the inner ring raceway surface 38a1. The rollers 38c are disposed between the inner ring raceway surface 38a1 and the outer ring raceway surface 38b1 so as to move by rolling on these raceway surfaces 38a1 and 38b1.

Referring to FIG. 2, the rotating portion support structure 17 includes the high-speed shaft 35 capable of rotating by receiving the rotational force of the output gear 40 and transmitting the rotational force to the drive shaft 41, and the roller bearings 38 and 39 rotatably supporting the high-speed shaft 35. Now, this rotating portion support structure 17 will be mainly described.

[Rotating Portion Support Structure (of First Example)]

Figure 4:
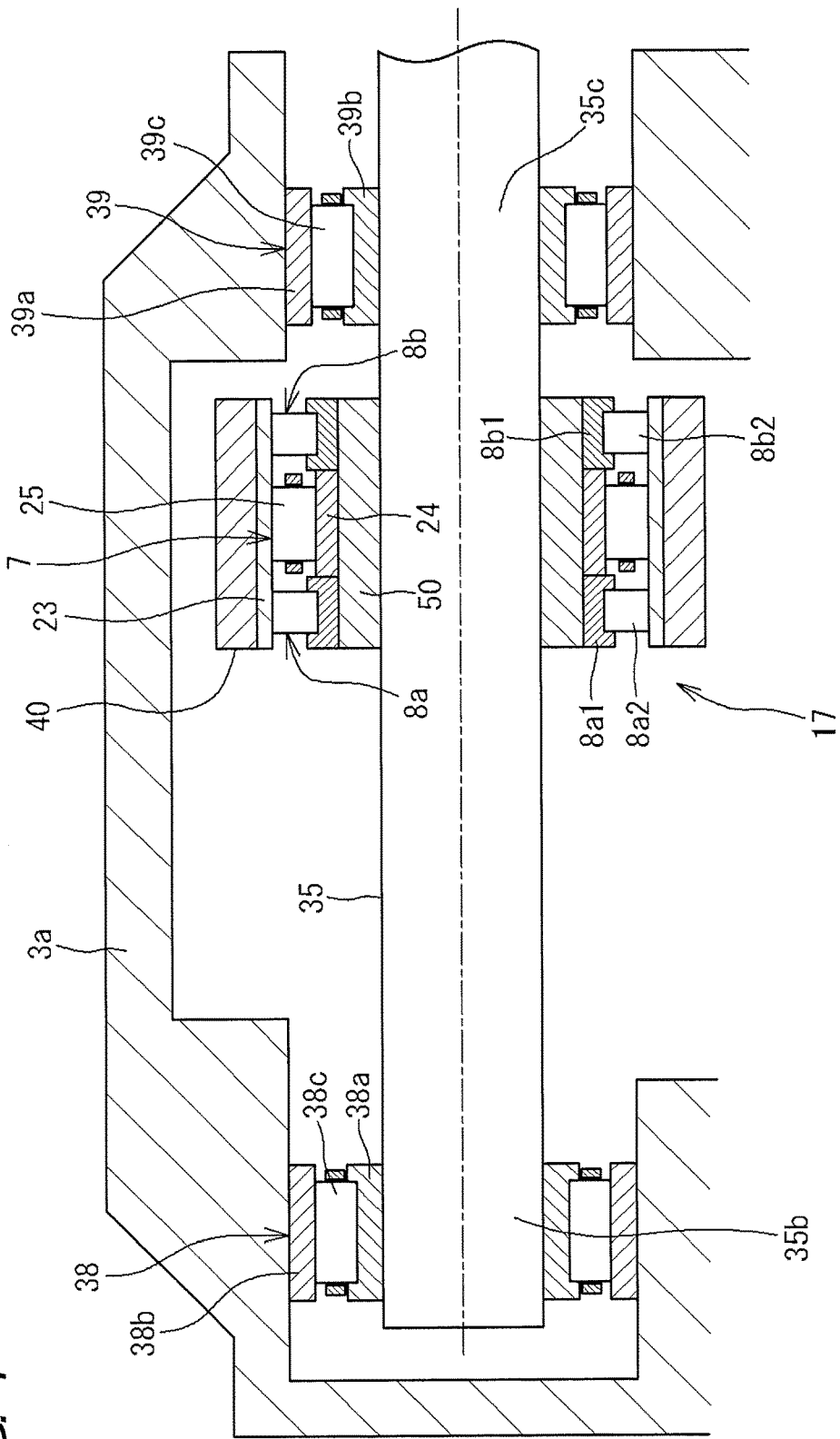
FIG. 4 is a cross-sectional view illustrating the rotating portion support structure (of a first example).

FIG. 4 is a cross-sectional view illustrating the rotating portion support structure 17 (of a first example). This rotating portion support structure 17 includes, as described above, the high-speed shaft 35 capable of rotating by receiving the rotational force of the output gear 40 and the roller bearings 38 and 39 rotatably supporting the high-speed shaft 35, and in addition, further includes a one-way clutch 7 provided between the output gear 40 and the high-speed shaft 35.

The output gear 40 is a ring-shaped gear provided coaxially with the high-speed shaft 35 and on an outer circumferential side of the high-speed shaft 35. The one-way clutch 7 is provided between the output gear 40 in a ring shape and the high-speed shaft 35. On the outer circumference of the output gear 40, a plurality of teeth engaged with the intermediate gear 34b (see FIG. 2) are formed.

The one-way clutch 7 includes a first clutch section provided on an inner circumferential side of the output gear 40 and rotating integrally with the output gear 40, and a second clutch section rotating integrally with the high-speed shaft 35. In the present embodiment, the first clutch section is formed by a first clutch member 23 different from a member forming the output gear 40, and the second clutch section is formed by a second clutch member 24 different from a member forming the high-speed shaft 35. Besides, in the present embodiment, a cylindrical attaching member 50 is fixed on the outer circumference of the high-speed shaft 35, and the second clutch member 24 is fixed on a center portion along the axial direction of the attaching member 50.

The first clutch member 23 is formed by a cylindrical member fixed on the inner circumference of the output gear 40, and the second clutch member 24 is formed by a cylindrical member fixed via the attaching member 50 on the outer circumferential side of the high-speed shaft 35. Incidentally, the first clutch section may be formed by a part of an inner circumferential portion of the output gear 40, and the second clutch section may be formed by a part of an outer circumferential portion of the high-speed shaft 35 (or the attaching member 50).

Besides, the one-way clutch 7 includes an engaging element disposed between the first clutch member 23 and the second clutch member 24. In the present embodiment, the engaging member is formed by rollers (cylindrical rollers) 25.

Figure 5:
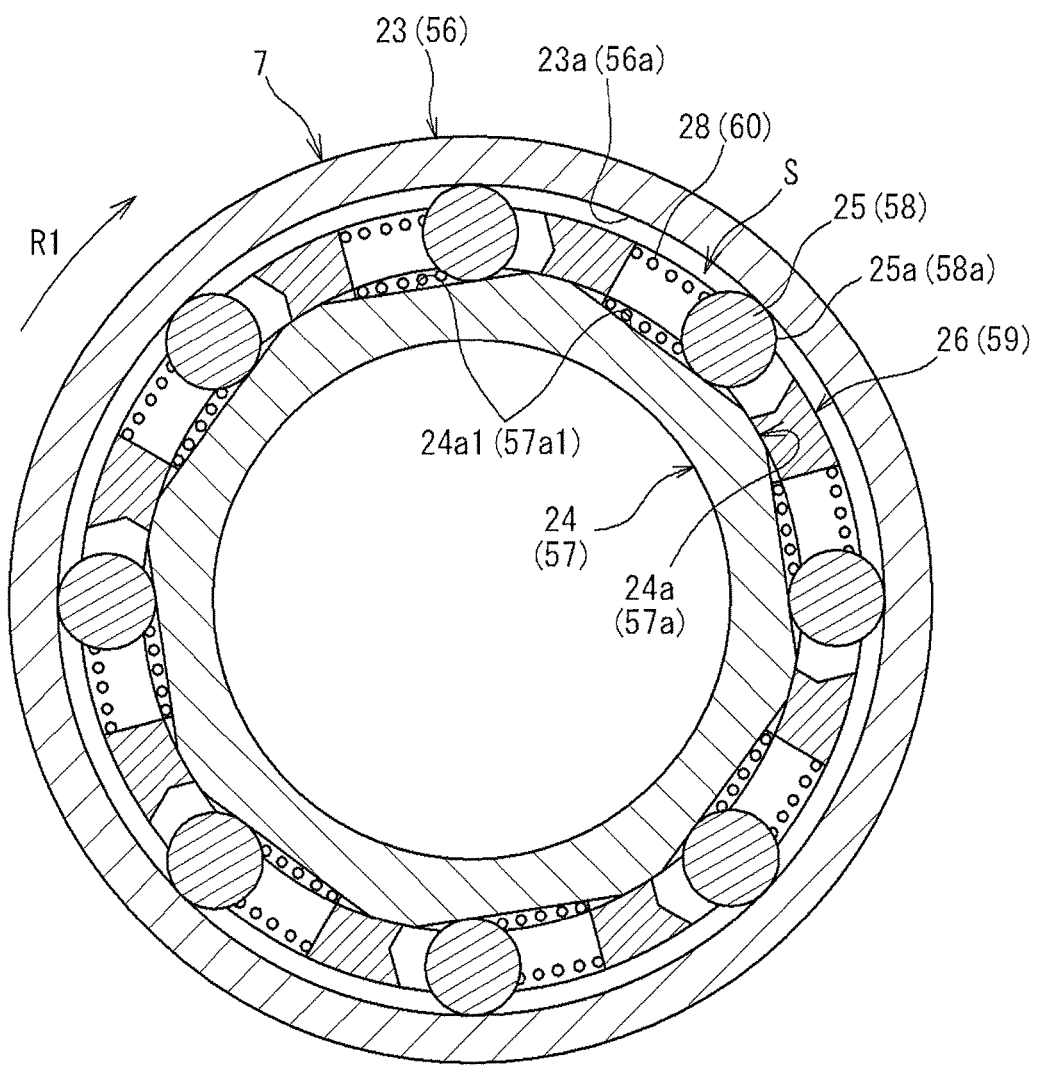
FIG. 5 is a side cross-sectional view of a one-way clutch.

FIG. 5 is a side cross-sectional view of the one-way clutch 7. The one-way clutch 7 further includes a ring-shaped cage 26 for holding the respective rollers 25 at prescribed intervals along the circumferential direction, and elastic members (pressing members) 28 respectively elastically pressing the rollers 25 in one direction along the circumferential direction.

An inner circumferential surface 23a of the first clutch member 23 is formed as a cylindrical surface, and flat cam surfaces 24a1 in the same number as the rollers 25 (namely, eight) are formed on an outer circumferential surface 24a of the second clutch member 24. Therefore, wedge-shaped spaces S in the same number as the rollers 25 (namely, eight) are formed between the cam surfaces 24a1 and the inner circumferential surface 23a of the first clutch member 23. In each wedge-shaped space S, one roller 25 is disposed.

Incidentally, the inner circumferential surface 23a of the first clutch member 23 forming the respective wedge-shaped spaces S is formed by cylindrical surfaces continuous along the circumferential direction, but it may be formed by arc surfaces not continuous along the circumferential direction, such as independent arc surfaces having a flat surface or an infection point disposed therebetween along the circumferential direction.

Each roller 25 is pressed by the elastic member 28 toward a direction where the wedge-shaped space S becomes smaller. The roller 25 has, as its outer circumferential surface, a contact surface 25a in contact with the cam surface 24a1 of the second clutch member 24 and the inner circumferential surface 23a of the first clutch member 23, and this contact surface 25a is formed to extend straight along the width direction (the axial direction).

Further referring to FIG. 4, the one-way clutch 7 further includes a clutch rolling bearing section provided between the output gear 40 and the high-speed shaft 35. In the present embodiment, the clutch rolling bearing includes cylindrical roller bearings 8a and 8b, which are provided on both sides along the axial direction of a roller row (an engaging element row) composed of the plural rollers 25. The cylindrical roller bearing 8a has the same structure as the cylindrical roller bearing 8b, and each of these includes an outer ring portion, an inner ring portion and cylindrical rollers 8a2 (or 8b2) disposed between the outer ring portion and the inner ring portion and moving by rolling on an inner circumferential surface of the outer ring portion and an outer circumferential surface of the inner ring portion.

In the present embodiment, the inner ring portion corresponds to an inner ring 8a1 (or 8b1) fixed on the attaching member 50, but the outer ring portion is formed by a part (both end portions along the axial direction) of the first clutch member 23 in the cylindrical shape. In other words, a part (both end portions along the axial direction) of the first clutch member 23 in the cylindrical shape is used also as the outer ring for the cylindrical roller bearing 8a (or 8b).

When these cylindrical roller bearings 8a and 8b are used, even if the engagement of the cylindrical rollers 25 corresponding to the engaging element of the one-way clutch 7 with the first clutch member 23 and the second clutch member 24 is released, the first clutch member 23 and the second clutch member 24 can be relatively rotatably supported, which will be described later.

The function of the rotating portion support structure 17 (of the first example) configured as described above will now be described.

In a state where the main shaft 2 (see FIG. 1) is rotating in a positive direction, if the rotational frequency of the main shaft 2 is increased because, for example, a wind force is increased, the rotational speed output by the speed-up gear 3 is increased as a result, which increases the rotational speed of the output gear 40 (see FIG. 4). In the case where the rotational speed of the output gear 40 exceeds the rotational speed of the high-speed shaft 35 because the output gear 40 is thus rotated at an increasing speed, the first clutch member 23 rotating integrally with the output gear 40 is to rotate in one direction (a direction shown with an arrow R1 in FIG. 5) relatively to the second clutch member 24.

In this case, the roller 25 slightly moves, owing to the pressing force (restoring force) applied by the elastic member 28, in the direction where the wedge-shaped space S becomes smaller (in the clockwise direction in FIG. 5), the contact surface 25a of the roller 25 is pressed against the inner circumferential surface 23a of the first clutch member 23 and the outer circumferential surface 24a (the cam surface 24a1) of the second clutch member 24, and hence, the roller 25 is engaged between the first and second clutch members 23 and 24. As a result, the first clutch member 23 and the second clutch member 24 can integrally rotate in the one (R1) direction. In other words, the output gear 40 on which the first clutch member 23 is fixed and the high-speed shaft 35 on which the second clutch member 24 is fixed are connected to each other so as to integrally rotate.

Besides, if the output gear 40 rotates at a constant speed after rotating at an increasing speed and as a result, the rotational speed of the output gear 40 becomes the same as the rotational speed of the high-speed shaft 35, the roller 25 is held in a state where it is engaged between the first and second clutch members 23 and 24. Therefore, the integral rotation of the first and second clutch members 23 and 24, namely, the integral rotation of the output gear 40 and the high-speed shaft 35, is retained.

On the other hand, if the rotational frequency of the main shaft 2 is decreased because, for example, the wind force is decreased, the output gear 40 rotates at a decreasing speed. In the case where the output gear 40 rotates at a decreasing speed and as a result, the rotational speed of the output gear 40 becomes lower than the rotational speed of the high-speed shaft 35, the first clutch member 23 rotating integrally with the output gear 40 is to rotate relatively to the second clutch member 24 in another direction (a direction opposite to the arrow R1 in FIG. 5).

In this case, the roller 25 slightly moves, against the pressing force applied by the elastic member 28, in a direction where the wedge-shaped space S becomes larger, and thus, the engagement between the roller 25 and the first and second clutch members 23 and 24 is released. Since the engagement of the roller 25 is thus released, the connection between the output gear 40 on which the first clutch member 23 is fixed and the high-speed shaft 35 on which the second clutch member 24 is fixed is released.

In this manner, according to the rotating portion support structure 17 (of the first example) including the one-way clutch 7, if the rotational speed of the output gear 40 exceeds the rotational speed of the high-speed shaft 35, the output gear 40 and the high-speed shaft 35 are integrally rotatably connected to each other, and if the rotational speed of the output gear 40 becomes lower than the rotational speed of the high-speed shaft 35, the connection between the output gear 40 and the high-speed shaft 35 is broken (namely, the power transmission between the output gear 40 and the high-speed shaft 35 is broken).

Accordingly, if the rotational speed of the output gear 40 exceeds the rotational speed of the high-speed shaft 35 and the output gear 40 and the high-speed shaft 35 are integrally rotatably connected to each other, power is transmitted from the output gear 40 to the high-speed shaft 35 and the drive shaft 41 (see FIG. 2). As a result, the drive shaft 41 and the rotor 42 are rotated to generate electric power.

On the contrary, if the rotational speed of the output gear 40 becomes lower than the rotational speed of the high-speed shaft 35, the connection (the power transmission) between the output gear 40 and the high-speed shaft 35 is broken. Therefore, even if the rotational speed of the main shaft 2 is abruptly lowered due to the lowering of the wind force, and as a result the rotational speed of the output gear 40 is abruptly lowered, the high-speed shaft 35 is inertially rotated together with the rotor 42 and the drive shaft 41 of the power generator 4, and therefore, an abrupt torque loss is prevented, and the rotation delay of the rollers 38c and 39c of the roller bearings 38 and 39 supporting the high-speed shaft 35 can be suppressed.

As a result, even when the rotational speed of the main shaft 2 is abruptly increased from this state due to a change of the wind force and the output gear 40 and the high-speed shaft 35 are connected to each other again to rotate the high-speed shaft 35 by the rotational force received from the output gear 40, the rollers 38c and 39c are difficult to slip on the contact surfaces (38a1 and 38b1 in FIG. 3) with the inner and outer rings 38a and 38b in the roller bearings 38 and 39 supporting the high-speed shaft 35, and thus, the occurrence of smearing in the roller bearings 38 and 39 can be suppressed.

Besides, since the one-way clutch 7 is provided inside along the radial direction of the output gear 40 in the present embodiment, the rotating portion support structure 17 can be made compact.

Furthermore, since the cylindrical roller bearings 8a and 8b are provided as the clutch roller bearing section adjacent to the row of the rollers 25 corresponding to the engaging element, even if the engagement of the rollers 25 with the first clutch member 23 and the second clutch member 24 is released, the output gear 40 rotating integrally with the first clutch member 23 and the high-speed shaft 35 rotating integrally with the second clutch member 24 can be relatively rotatably supported. Therefore, the output gear 40 can relatively rotate while retaining its coaxial alignment with the high-speed shaft 35.

Besides, as described above, the outer circumferential surface (the contact surface 25a) of the cylindrical roller 25 used as the engaging element is formed to extend straight along the axial direction. Besides, the clutch roller bearing section is formed by the cylindrical roller bearings 8a (and 8b), a rolling element of each of the bearings is the cylindrical roller 8a2 (or 8b2), and an outer circumferential surface of the roller is formed to extend straight along the axial direction. Therefore, since the cylindrical roller 25 and the cylindrical roller 8a2 (or 8b2) are allowed to slip along the axial direction on the first clutch member 23, the first clutch member 23 and the second clutch member 24 can be relatively moved along the axial direction (namely, are formed to allow relative movement along the axial direction).

From the above, since the output gear 40 integrated with the first clutch member 23 and the high-speed shaft 35 integrated with the second clutch member 24 are relatively movable along the axial direction, even if the high-speed shaft 35 expands/contracts due to a temperature change, the expansion/contraction can be cancelled, and hence, occurrence of a large thermal stress in the high-speed shaft 35 can be prevented.

[Rotating Portion Support Structure (of Second Example)]

Figure 6:
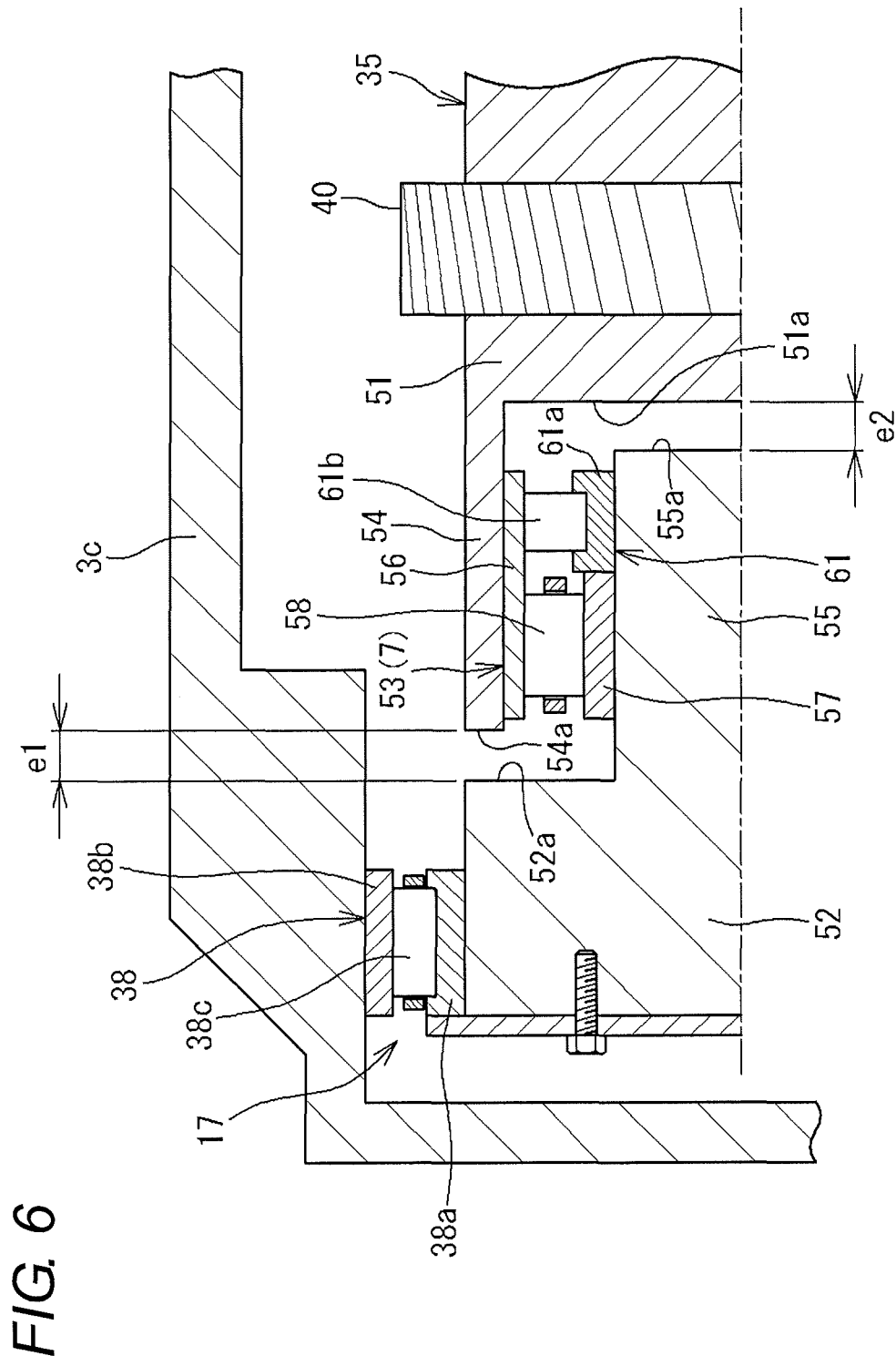
FIG. 6 is a cross-sectional view illustrating the rotating portion support structure (of a second example).

FIG. 6 is a cross-sectional view illustrating the rotating portion support structure 17 (of a second example). In FIGS. 2 and 6, the rotating portion support structure 17 includes, as described above, the high-speed shaft 35 capable of rotating by receiving the rotational force of the output gear 40 and transmitting the rotational force to the drive shaft 41, and the roller bearings 38 and 39 rotatably supporting the high-speed shaft 35.

In the present embodiment, the high-speed shaft 35 includes, as illustrated in FIG. 6, a first shaft section 51 rotating integrally with the output gear 40, a second shaft section 52 supported by the roller bearing 38, and a connecting section 53 provided between the first shaft section 51 and the second shaft section 52. In other words, the high-speed shaft 35 includes the first shaft section 51 and the second shaft section 52 separated from each other. The first shaft section 51 and the second shaft section 52 are, however, disposed on the same axial line.

The output gear 40 is externally fit and fixed on the first shaft section 51. Incidentally, the roller bearing 39 (see FIG. 2) is provided on a side of the first shaft section 51, so as to rotatably support the first shaft section 51.

The first shaft section 51 has, at its shaft end, a cylindrical portion 54, and the second shaft section 52 has, at its shaft end, a center shaft portion 55. The center shaft portion 55 is positioned inside the cylindrical portion 54 along the radial direction, and the center shaft portion 55 and the cylindrical portion 54 are coaxially disposed. Besides, a ring-shaped space is formed between the center shaft portion 55 and the cylindrical portion 54, and the connecting section 53 is provided in this space.

Besides, between an end surface 54a of the cylindrical portion 54 and an end surface 52a of the second shaft section 52, a gap e1 along the axial direction is provided, and between an end surface 55a of the center shaft portion 55 and an end surface 51a of the first shaft section 51, a gap e2 along the axial direction is provided.

The connecting section 53 is formed by a one-way clutch 7 that integrally rotatably connects the first shaft section 51 and the second shaft section 52 to each other or breaks (releases) this connection. The one-way clutch 7 includes a first clutch section provided on the inner circumferential side of the cylindrical portion 54 and rotating integrally with the cylindrical portion 54, and a second clutch section provided on the outer circumferential side of the center shaft portion 55 and rotating integrally with the center shaft portion 55. In the present embodiment, the first clutch section is formed by a first clutch member 56 different from a member forming the cylindrical portion 54, and the second clutch section is formed by a second clutch member 57 different from a member forming the center shaft portion 55. The first clutch member 56 is formed by a cylindrical member fixed on the cylindrical portion 54, and the second clutch member 57 is formed by a cylindrical member fixed on the center shaft portion 55. Incidentally, the first clutch section may be formed by a part of an inner circumferential portion of the cylindrical portion 54, and the second clutch section may be formed by a part of an outer circumferential portion of the center shaft portion 55.

Besides, the one-way clutch 7 includes an engaging element disposed between the first clutch member 56 and the second clutch member 57. In the present embodiment, the engaging member is formed by rollers (cylindrical rollers) 58.

The side cross-section of the one-way clutch 7 is the same as that of the one-way clutch 7 of the aforementioned embodiment (FIG. 4), and the one-way clutch 7 of FIG. 6 will be described with reference to FIG. 5. The one-way clutch 7 further includes a ring-shaped cage 59 for holding the respective rollers 58 at prescribed intervals along the circumferential direction, and elastic members (pressing members) 60 respectively elastically pressing the rollers 58 in one direction along the circumferential direction.

Besides, an inner circumferential surface 56a of the first clutch member 56 is formed as a cylindrical surface, and flat cam surfaces 57a1 in the same number as the rollers 58 (namely, eight) are formed on an outer circumferential surface 57a of the second clutch member 57. Therefore, wedge-shaped spaces S in the same number as the rollers 58 (namely, eight) are formed between the cam surfaces 57a1 and the inner circumferential surface 56a of the first clutch member 56. In each wedge-shaped space S, one roller 58 is disposed.

Incidentally, the inner circumferential surface 56a of the first clutch member 56 forming the respective wedge-shaped spaces S is formed by cylindrical surfaces continuous along the circumferential direction, but it may be formed by arc surfaces not continuous along the circumferential direction, such as independent arc surfaces having a flat surface or an infection point disposed therebetween along the circumferential direction.

Furthermore, each roller 58 is pressed by the elastic member 60 toward a direction where the wedge-shaped space S becomes smaller. The roller 58 has, as its outer circumferential surface, a contact surface 58a in contact with the cam surface 57a1 of the second clutch member 57 and the inner circumferential surface 56a of the first clutch member 56, and this contact surface 58a is formed to extend straight along the width direction (the axial direction).

Further referring to FIG. 6, the one-way clutch 7 further includes a clutch rolling bearing section provided between the cylindrical portion 54 and the center shaft portion 55. In the present embodiment, the clutch rolling bearing includes a cylindrical roller bearing 61, which is provided adjacent along the axial direction to a roller row (an engaging element row) composed of the plural rollers 58. The cylindrical roller bearing 61 has an outer ring portion, an inner ring portion and a cylindrical roller 61b disposed between the outer ring portion and the inner ring portion and moving by rolling on an inner circumferential surface of the outer ring portion and an outer circumferential surface of the inner ring portion.

In the present embodiment, the inner ring portion corresponds to an inner ring 61a fixed on the center shaft portion 55, but the outer ring portion is formed by a part of the first clutch member 56 in the cylindrical shape. In other words, a part of the first clutch member 56 in the cylindrical shape is used also as the outer ring for the cylindrical roller bearing 61.

When the cylindrical roller bearing 61 is used, even if the engagement of the cylindrical rollers 58 corresponding to the engaging element of the one-way clutch 7 with the first clutch member 56 and the second clutch member 57 is released, the first clutch member 56 and the second clutch member 57 can be relatively rotatably supported, which will be described later.

The function of the rotating portion support structure 17 (of the second example) configured as described above will now be described.

In a state where the main shaft 2 (see FIG. 1) is rotating in a positive direction, if the rotational frequency of the main shaft 2 is increased because, for example, a wind force is increased, the rotational speed output by the speed-up gear 3 is increased, which increases the rotational speed of the output gear 40 and the first shaft section 51 (see FIG. 6) of the high-speed shaft 35. In the case where the rotational speed of the first shaft section 51 exceeds the rotational speed of the second shaft section 52 because the first shaft section 51 is thus rotated at an increasing speed, the first clutch member 56 rotating integrally with the first shaft section 51 is to rotate in one direction (a direction shown with the arrow R1 in FIG. 5) relatively to the second clutch member 57.

In this case, the roller 58 slightly moves, owing to the pressing force (the restoring force) applied by the elastic member 60, in the direction where the wedge-shaped space S becomes smaller (in the clockwise direction in FIG. 5), the contact surface 58a of the roller 58 is pressed against the inner circumferential surface 56a of the first clutch member 56 and the outer circumferential surface 57a (the cam surface 57a1) of the second clutch member 57, and hence, the roller 58 is engaged between the first and second clutch members 56 and 57. As a result, the first clutch member 56 and the second clutch member 57 can integrally rotate in the one (R1) direction. In other words, the first shaft section 51 on which the first clutch member 56 is fixed and the second shaft section 52 on which the second clutch member 57 is fixed are connected to each other so as to integrally rotate.

Besides, if the first shaft section 51 of the high-speed shaft 35 rotates at a constant speed after rotating at an increasing speed and as a result, the rotational speed of the first shaft section 51 becomes the same as the rotational speed of the second shaft section 52, the roller 58 is held in a state where it is engaged between the first and second clutch members 56 and 57. Therefore, the integral rotation of the first and second clutch members 56 and 57, namely, the integral rotation of the first shaft section 51 and the second shaft section 52, is retained.

On the other hand, if the rotational frequency of the main shaft 2 is decreased because, for example, the wind force is decreased, the first shaft section 51 of the high-speed shaft 35 rotates at a decreasing speed. In the case where the first shaft section 51 thus rotates at a decreasing speed and as a result, the rotational speed of the first shaft section 51 becomes lower than the rotational speed of the second shaft section 52, the first clutch member 56 rotating integrally with the first shaft section 51 is to rotate relatively to the second clutch member 57 in another direction (the direction opposite to the arrow R1 in FIG. 5).

In this case, the roller 58 slightly moves, against the pressing force applied by the elastic member 60, in the direction where the wedge-shaped space S becomes larger, and thus, the engagement between the roller 58 and the first and second clutch members 56 and 57 is released. Since the engagement of the roller 58 is thus released, the connection between the first shaft section 51 on which the first clutch member 56 is fixed and the second shaft section 52 on which the second clutch member 57 is fixed is released.

In this manner, according to the rotating portion support structure 17 (of the second example) including the one-way clutch 7, if the rotational speed of the first shaft section 51 exceeds the rotational speed of the second shaft section 52 in the high-speed shaft 35, the first shaft section 51 and the second shaft section 52 are integrally rotatably connected to each other, and if the rotational speed of the first shaft section 51 becomes lower than the rotational speed of the second shaft section 52, the connection between the first shaft section 51 and the second shaft section 52 is broken (namely, the power transmission between the first shaft section 51 and the second shaft section 52 is broken).

In this manner, if the rotational speed of the first shaft section 51 rotating integrally with the output gear 40 of the speed-up gear 3 becomes lower than the rotational speed of the second shaft section 52 in the high-speed shaft 35, the connection (the power transmission) between the first shaft section 51 and the second shaft section 52 is broken by the one-way clutch 7. Therefore, even if the rotational speed of the main shaft 2 is abruptly lowered due to the lowering of the wind force, and as a result the rotational speed of the output gear 40 and the first shaft section 51 is abruptly lowered, the second shaft section 52 is inertially rotated, and therefore, an abrupt torque loss is prevented, and the rotation delay of the rollers 38c of the roller bearing 38 supporting the second shaft section 52 can be suppressed. As a result, even when the rotational speed of the main shaft 2 is abruptly increased from this state due to a change of the wind force and the first shaft section 51 and the second shaft section 52 are connected to each other again to rotate the second shaft section 52 by the rotational force received from the first shaft section 51, the rollers 38c are difficult to slip on the contact surfaces (38a1 and 38b1 in FIG. 3) with the inner and outer rings 38a and 38b in the roller bearing 38 supporting the second shaft section 52, and thus, the occurrence of smearing in the roller bearing 38 can be suppressed. In addition, the occurrence of smearing in the roller bearing 39 (see FIG. 2) supporting the first shaft section 51 can be also suppressed.

Besides, since the one-way clutch 7 is provided as a part of the high-speed shaft 35, namely, between the first shaft section 51 and the second shaft section 52, in the present embodiment, the rotating portion support structure 17 can be made compact.

Furthermore, since the cylindrical roller bearing 61 is provided as the clutch roller bearing section adjacent to the row of the rollers 58 corresponding to the engaging element, even if the engagement of the rollers 58 with the first clutch member 56 and the second clutch member 57 is released, the first shaft section 51 rotating integrally with the first clutch member 56 and the second shaft section 52 rotating integrally with the second clutch member 57 can be relatively rotatably supported. Therefore, the second shaft section 52 can relatively rotate while retaining its coaxial alignment with the first shaft section 51.

Besides, as described above, the outer circumferential surface (the contact surface 58a) of the cylindrical roller 58 used as the engaging element is formed to extend straight along the axial direction. Besides, the clutch roller bearing section is formed by the cylindrical roller bearing 61, a rolling element of the bearing is the cylindrical roller 61b, and an outer circumferential surface of the roller is formed to extend straight along the axial direction. Therefore, since the cylindrical roller 58 and the cylindrical roller 61b are allowed to slip along the axial direction on the first clutch member 56, the first clutch member 56 and the second clutch member 57 can be relatively moved along the axial direction (namely, are formed to allow relative movement along the axial direction).

Furthermore, as illustrated in FIG. 6, a gap e1 along the axial direction is provided between an end surface 54a of the cylindrical portion 54 and an end surface 52a of the second shaft section 52, and a gap e2 along the axial direction is provided between an end surface 55a of the center shaft portion 55 and an end surface 51a of the first shaft section 51. These gaps e1 and e2 are set to be respectively larger than amounts of the movement along the axial direction of the first shaft section 51 and the second shaft section 52. Incidentally, the "amount of the movement along the axial direction" refers to the maximum value (the designed maximum value) of a sum of an amount of extension along the axial direction of the first shaft section 51 and an amount of extension along the axial direction of the second shaft section 52. It is noted that the extension along the axial direction is caused by the expansion along the axial direction of the first shaft section 51 and the second shaft section 52 due to temperature increase.

In other words, the gap e1 and the gap e2 are gaps provided respectively for allowing the relative movement along the axial direction of the first clutch member 56 fixed on the first shaft section 51 and the second clutch member 57 fixed on the second shaft section 52, the gap e1 and the gap e2 are respectively set as the maximum allowable amount of the relative movement, and the gap e1 and the gap e2 are respectively set to be larger than the amount of the movement along the axial direction (the sum of the amounts of the extension along the axial direction) of the first shaft section 51 and the second shaft section 52.

From the above, since the first shaft section 51 integrated with the first clutch member 56 and the second shaft section 52 integrated with the second clutch member 57 are relatively movable along the axial direction, even if the high-speed shaft 35 expands/contracts due to a temperature change, the expansion/contraction can be cancelled, and hence, the occurrence of a large thermal stress in the high-speed shaft 35 can be prevented.

[Rotating Portion Support Structure (of Third Example)]

Figure 7:
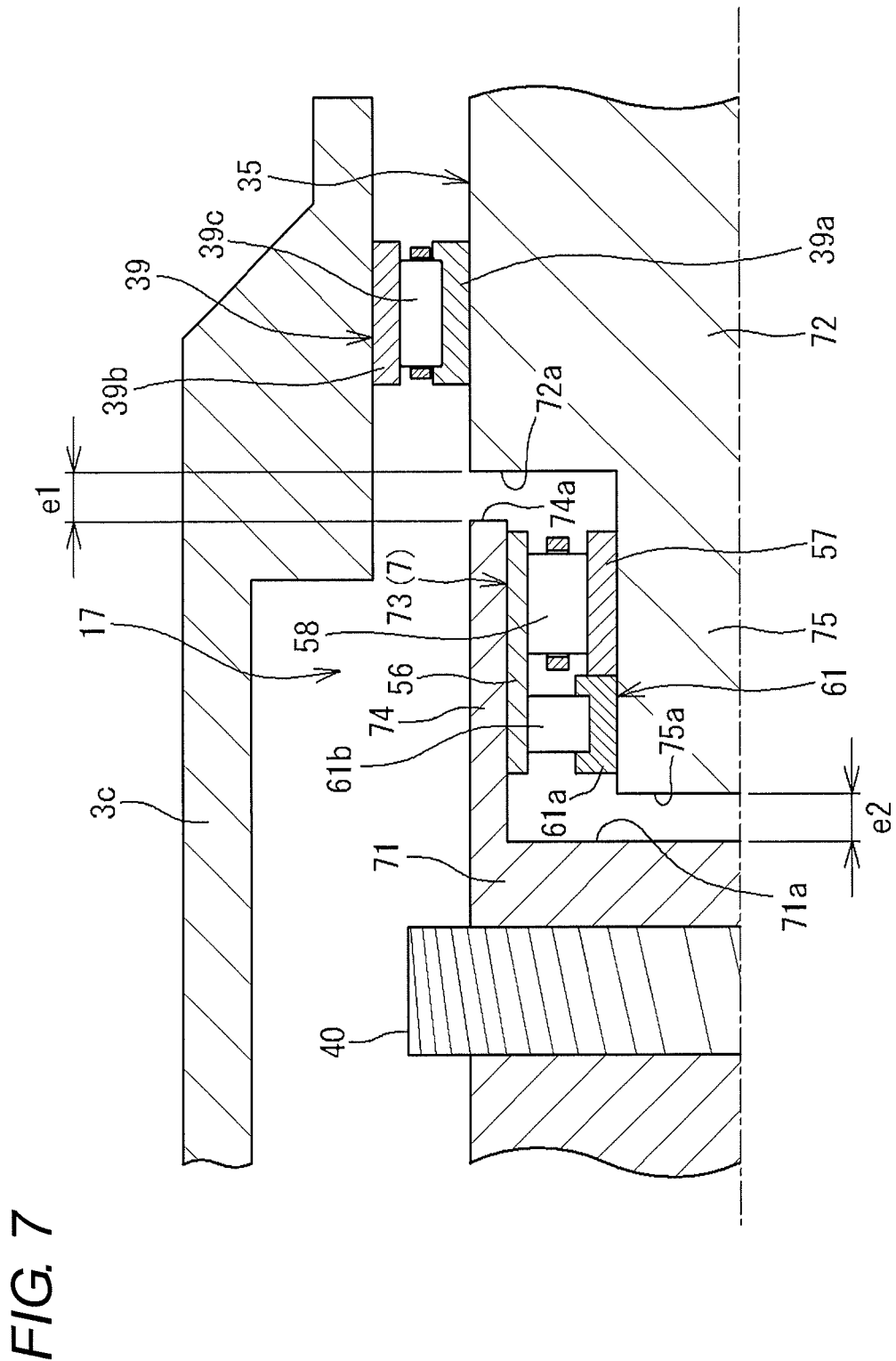
FIG. 7 is a cross-sectional view illustrating the rotating portion support structure (of a third example).

FIG. 7 is a cross-sectional view illustrating the rotating portion support structure 17 (of a third example). In FIGS. 2 and 7, the rotating portion support structure 17 includes, as described above, the high-speed shaft 35 capable of rotating by receiving the rotational force of the output gear 40 and transmitting the rotational force to the drive shaft 41, and the roller bearings 38 and 39 rotatably supporting the high-speed shaft 35.

In the present embodiment, the high-speed shaft 35 includes, as illustrated in FIG. 7, a first shaft section 71 rotating integrally with the output gear 40, a second shaft section 72 supported by the roller bearing 39, and a connecting section 73 provided between the first shaft section 71 and the second shaft section 72. In other words, the high-speed shaft 35 includes the first shaft section 71 and the second shaft section 72 separated from each other. The first shaft section 71 and the second shaft section 72 are, however, disposed on the same axial line.

The output gear 40 is externally fit and fixed on the first shaft section 71. Incidentally, the roller bearing 38 (see FIG. 2) is provided on a side of the first shaft section 71, so as to rotatably support the first shaft section 71.

The first shaft section 71 has, at its shaft end, a cylindrical portion 74, and the second shaft section 72 has, at its shaft end, a center shaft portion 75. The center shaft portion 75 is disposed inside the cylindrical portion 74 along the radial direction, and the center shaft portion 75 and the cylindrical portion 74 are coaxially disposed. Besides, a ring-shaped space is formed between the center shaft portion 75 and the cylindrical portion 74, and the connecting section 73 is provided in this space.

Besides, between an end surface 74a of the cylindrical portion 74 and an end surface 72a of the second shaft section 72, a gap e1 along the axial direction is provided, and between an end surface 75a of the center shaft portion 75 and an end surface 71a of the first shaft section 71, a gap e2 along the axial direction is provided.

The connecting section 73 is formed by a one-way clutch 7 that integrally rotatably connects the first shaft section 71 and the second shaft section 72 to each other or breaks (releases) this connection. The one-way clutch 7 includes a first clutch section provided on the inner circumferential side of the cylindrical portion 74 and rotating integrally with the cylindrical portion 74, and a second clutch section rotating integrally with the center shaft portion 75. In the present embodiment, the first clutch section is formed by a first clutch member 56 different from a member forming the cylindrical portion 74, and the second clutch section is formed by a second clutch member 57 different from a member forming the center shaft portion 75. The first clutch member 56 is formed by a cylindrical member fixed on the cylindrical portion 74, and the second clutch member 57 is formed by a cylindrical member fixed on the center shaft portion 75. Incidentally, the first clutch section may be formed by a part of an inner circumferential portion of the cylindrical portion 74, and the second clutch section may be formed by a part of an outer circumferential portion of the center shaft portion 75.

Besides, the one-way clutch 7 includes an engaging element disposed between the first clutch member 56 and the second clutch member 57. In the present embodiment, the engaging member is formed by rollers (cylindrical rollers) 58. It is noted that the one-way clutch 7 of FIG. 7 has the same structure as the one-way clutch 7 of FIG. 6.

The side cross-section of the one-way clutch 7 of FIG. 7 is the same as that of the one-way clutch 7 of the aforementioned embodiment (FIG. 6), and the one-way clutch 7 of FIG. 7 will be described with reference to FIG. 5. The one-way clutch 7 further includes a ring-shaped cage 59 for holding the respective rollers 58 at prescribed intervals along the circumferential direction, and elastic members (pressing members) 60 respectively elastically pressing the rollers 58 in one direction along the circumferential direction.

Besides, an inner circumferential surface 56a of the first clutch member 56 is formed as a cylindrical surface, and flat cam surfaces 57a1 in the same number as the rollers 58 (namely, eight) are formed on an outer circumferential surface 57a of the second clutch member 57. Therefore, wedge-shaped spaces S in the same number as the rollers 58 (namely, eight) are formed between the cam surfaces 57a1 and the inner circumferential surface 56a of the first clutch member 56. In each wedge-shaped space S, one roller 58 is disposed.

Incidentally, the inner circumferential surface 56a of the first clutch member 56 forming the respective wedge-shaped spaces S is formed by cylindrical surfaces continuous along the circumferential direction, but it may be formed by arc surfaces not continuous along the circumferential direction, such as independent arc surfaces having a flat surface or an infection point disposed therebetween along the circumferential direction.

Each roller 58 is pressed by the elastic member 60 toward a direction where the wedge-shaped space S becomes smaller. The roller 58 has, as its outer circumferential surface, a contact surface 58a in contact with the cam surface 57a1 of the second clutch member 57 and the inner circumferential surface 56a of the first clutch member 56, and this contact surface 58a is formed to extend straight along the width direction (the axial direction).

Further referring to FIG. 7, the one-way clutch 7 further includes a clutch rolling bearing section provided between the cylindrical portion 74 and the center shaft portion 75. The clutch rolling bearing of the present embodiment has the same structure as the clutch rolling bearing of FIG. 6 (namely, is formed by a cylindrical roller bearing 61) and is provided adjacent along the axial direction to a roller row (an engaging element row) composed of the plural rollers 58. The cylindrical roller bearing 61 has an outer ring portion, an inner ring portion and a cylindrical roller 61b disposed between the outer ring portion and the inner ring portion and moving by rolling on an inner circumferential surface of the outer ring portion and an outer circumferential surface of the inner ring portion.

In the present embodiment, the inner ring portion corresponds to an inner ring 61a fixed on the center shaft portion 75, but the outer ring portion is formed by a part of the first clutch member 56 in the cylindrical shape. In other words, a part of the first clutch member 56 in the cylindrical shape is used also as the outer ring for the cylindrical roller bearing 61.

When the cylindrical roller bearing 61 is used, even if the engagement of the cylindrical rollers 58 corresponding to the engaging element of the one-way clutch 7 with the first clutch member 56 and the second clutch member 57 is released, the first clutch member 56 and the second clutch member 57 can be relatively rotatably supported, which will be described later.

The function of the rotating portion support structure 17 (of the third example) configured as described above is the same as that of the rotating portion support structure 17 (of the second example) illustrated in FIG. 6, and in the high-speed shaft 35, the one-way clutch 7 of the rotating portion support structure 17 (of the third example) integrally rotatably connects the first shaft section 71 and the second shaft section 72 to each other if the rotational speed of the first shaft section 71 exceeds the rotational speed of the second shaft section 72, and breaks the connection between the first shaft section 71 and the second shaft section 72 (namely, breaks the power transmission between the first shaft section 71 and the second shaft section 72) if the rotational speed of the first shaft section 71 becomes lower than the rotational speed of the second shaft section 72.

In this manner, if the rotational speed of the first shaft section 71 rotating integrally with the output gear 40 of the speed-up gear 3 exceeds the rotational speed of the second shaft section 72 in the high-speed shaft 35, the first shaft section 71 and the second shaft section 72 are integrally rotatably connected to each other, so as to transmit power from the output gear 40 and the first shaft section 71 to the second shaft section 72. As a result, the drive shaft 41 (see FIG. 2) is rotated to generate electric power.

On the contrary, if the rotational speed of the first shaft section 71 rotating integrally with the output gear 40 of the speed-up gear 3 becomes lower than the rotational speed of the second shaft section 72, the connection (the power transmission) between the first shaft section 71 and the second shaft section 72 is broken by the one-way clutch 7. Therefore, even if the rotational speed of the main shaft 2 is abruptly lowered due to the lowering of the wind force, and as a result the rotational speed of the output gear 40 and the first shaft section 71 is abruptly lowered, the second shaft section 72 is inertially rotated, and therefore, an abrupt torque loss is prevented, and the rotation delay of the rollers 39c of the roller bearing 39 supporting the second shaft section 52 can be suppressed. As a result, even when the rotational speed of the main shaft 2 is abruptly increased from this state due to a change of the wind force and the first shaft section 71 and the second shaft section 72 are connected to each other again to rotate the second shaft section 72 by the rotational force received from the first shaft section 71, the rollers 39c are difficult to slip on the contact surfaces with the inner and outer rings 39a and 39b in the roller bearing 39 supporting the second shaft section 72, and thus, the occurrence of smearing in the roller bearing 39 can be suppressed. In addition, the occurrence of smearing in the roller bearing 38 (see FIG. 2) supporting the first shaft section 51 can be also suppressed.

[Alternatives]

Alternatively, the rotating portion support structure 17 may include both the structures described in the (second example) and the (third example). In other words, the high-speed shaft 35 may be formed by a first shaft section supported by the roller bearing 38, a second shaft section on which the output gear 40 is fixed, and a third shaft section supported by the roller bearing 39, so that a connecting section 53 (see FIG. 6) described in the (second example) may be provided between the first shaft section and the second shaft section, and that a connecting section 73 (see FIG. 7) described in the (third example) may be provided between the second shaft section and the third shaft section.

In this case, the rotating portion support structure is configured, so that if the output gear 40 is rotated at an increasing speed, the first shaft section, the second shaft section and the third shaft section can integrally rotate, and if the output gear 40 is rotated at a decreasing speed, the connection between the first shaft section and the second shaft section can be broken, and the connection between the second shaft section and the third shaft section can be broken. Thus, the occurrence of smearing in the roller bearings 38 and 39 can be suppressed.

Incidentally, although the first shaft section includes the cylindrical portion and the second shaft section includes the center shaft portion in each of the embodiments illustrated in FIGS. 6 and 7, this configuration may be reversed, as long as one of the first shaft section and the second shaft section includes the cylindrical portion at its shaft end and the other includes, at its shaft end, the center shaft portion disposed inside the cylindrical portion along the radial direction.

Figure 8:
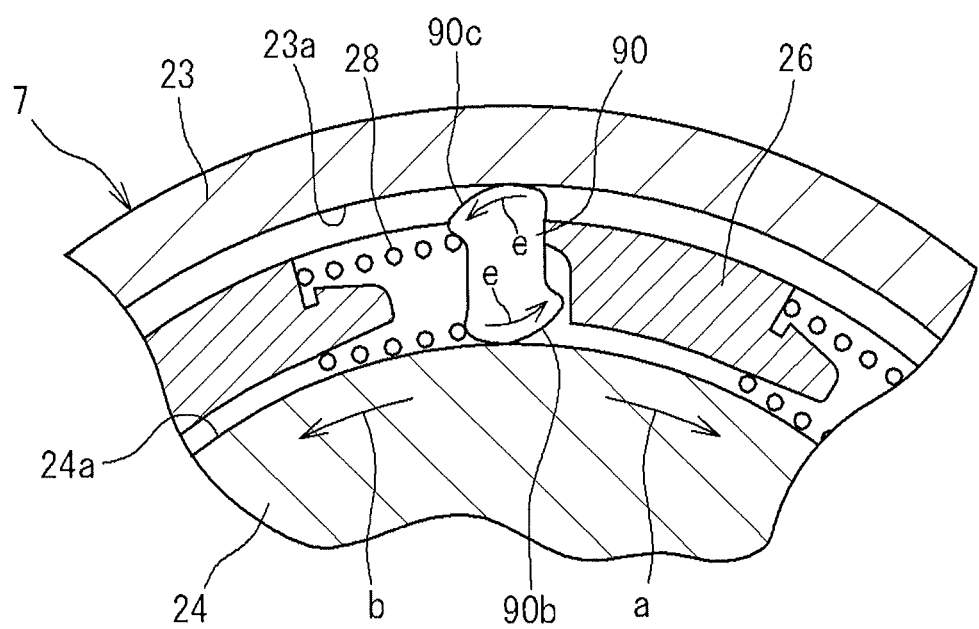
FIG. 8 is an explanatory diagram illustrating a modification of the one-way clutch.
Figure 9:
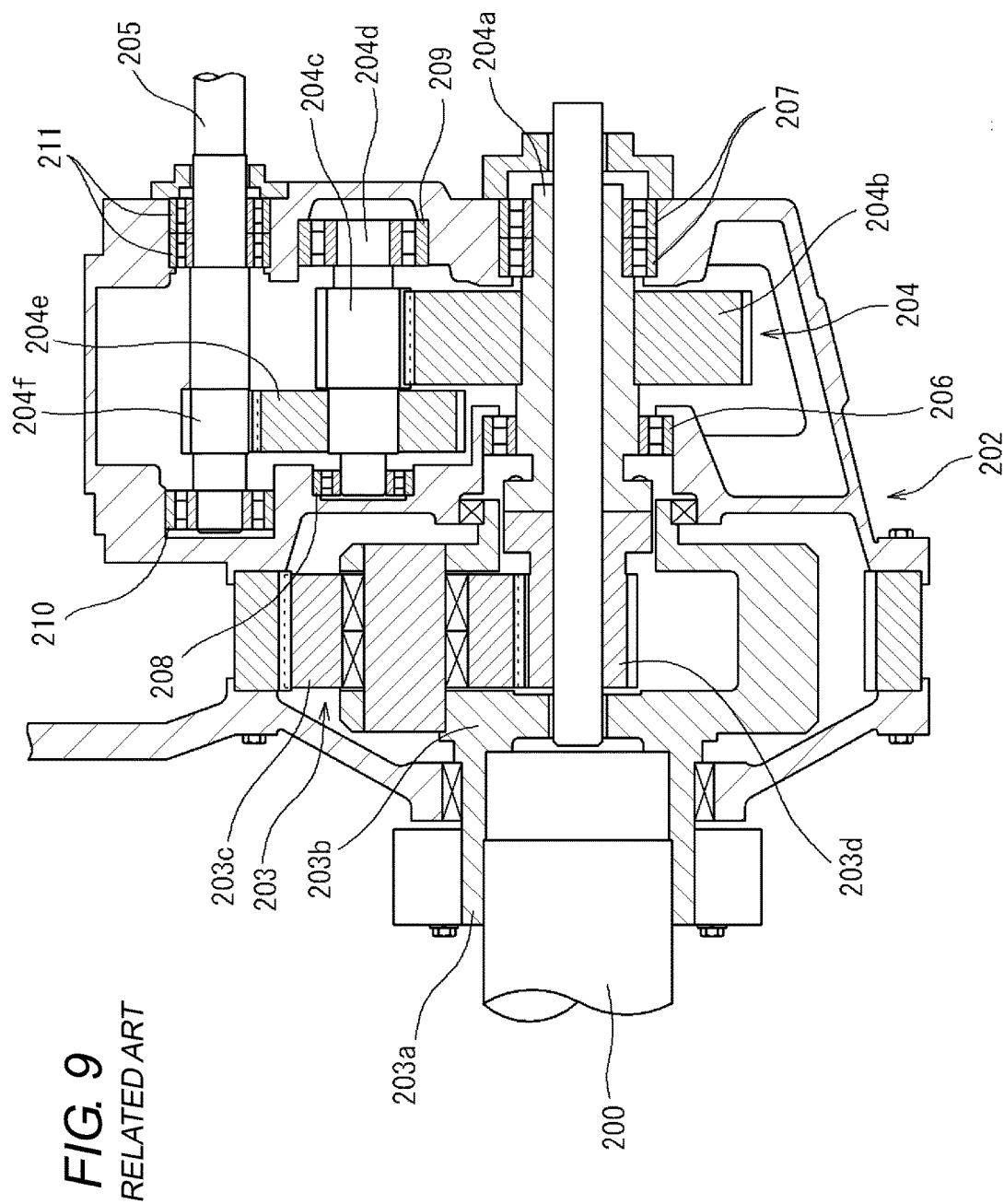
FIG. 9 is a cross-sectional view illustrating a related art speed-up gear.

FIG. 8 is an explanatory diagram illustrating a modification of the one-way clutch 7. Although the engaging element was a roller in each of the aforementioned embodiments, the engaging element may be a sprag 90 illustrated in FIG. 8. Besides, in this case, the outer circumferential surface 24a of the second clutch member 24 is formed by a cylindrical surface. The constituent is the same as that of each embodiment described above for the rest, and the description is herein omitted. A case where the sprag 90 is used as the engaging element of the rotating portion support structure 17 of FIG. 4 will now be described.

The sprag 90 includes a first contact surface 90b coming into contact with the outer circumferential surface 24a of the second clutch member 24, and a second contact surface 90c coming into contact with the inner circumferential surface 23a of the first clutch member 23, and each of the first contact surface 90b and the second contact surface 90c is formed in a projecting and substantially arc shape.

Besides, a distance from the contact point between the outer circumferential surface 24a and the first contact surface 90b to the contact point between the inner circumferential surface 23a and the second contact surface 90c (a distance between the contact points) is changed in accordance with the inclination of the sprag 90, and when the second clutch member 24 is rotated in a direction of an arrow a, the sprag 90 inclines in a direction of an arrow e, and hence the distance between the contact points is increased. On the contrary, when the second clutch member 24 is rotated in a direction of an arrow b, the sprag 90 inclines in an opposite direction to the arrow e, and hence the distance between the contact points is decreased.

When the distance between the contact points is increased, the sprag 90 engages with the first clutch member 23 and the second clutch member 24, and on the contrary, when the distance between the contact points is decreased, the engagement of the sprag 90 with the first clutch member 23 and the second clutch member 24 is released. Accordingly, when the second clutch member 24 is to rotate in the direction of the arrow a relatively to the first clutch member 23, the first clutch member 23 and the second clutch member 24 are integrally rotatably connected to each other, and when it relatively rotates in the direction of the arrow b, this connection is broken.

Besides, the power generation device and the like of the present invention are not limited to the type illustrated in the accompanying drawings but may be of another type within the scope of the present invention. Although the rolling bearing supporting the high-speed shaft 35 is described as a roller bearing in the aforementioned embodiments, it may be another type of rolling bearing, such as a ball bearing.

Furthermore, the wind power generation device is not limited to the horizontal axis type illustrated in FIG. 1 but may be a vertical axis type including a vertical main shaft although not shown. In addition, the power generation device may be one different from the wind power generation device, and may be, for example, a small- or mid-scale water power generation device or tidal power generation device.

The present application is based upon the prior Japanese patent application (Japanese Patent Application No. 2013-121924) filed on Jun. 10, 2013, the entire contents of which are incorporated herein by reference.

DESCRIPTION OF REFERENCE SIGNS

1: wind power generation device (power generation device)
2: main shaft
3: speed-up gear
4: power generator
7: one-way clutch
8a, 8b: cylindrical roller bearing (clutch rolling bearing section)
8a1: inner ring (inner ring portion)
8a2: cylindrical roller
17: rotating portion support structure
23: first clutch member (first clutch section)
24: second clutch member (second clutch section)
25: cylindrical roller (engaging element)
30: gear mechanism (rotation transmission mechanism)
35: high-speed shaft
38: roller bearing (rolling bearing)
39: roller bearing (rolling bearing)
40: output gear
41: drive shaft
42: rotor
51: first shaft section
52: second shaft section 53: connecting section
54: cylindrical portion
55: center shaft portion
56: first clutch member (first clutch section)
57: second clutch member (second clutch section)
58: roller (engaging element)
61: cylindrical roller bearing (clutch rolling bearing section)
61a: inner ring (inner ring portion)
61b: cylindrical roller
73: connecting section
74: cylindrical portion
75: center shaft portion
76: first clutch member (first clutch section)
77: second clutch member (second clutch section)
78: roller (engaging element)
81: cylindrical roller bearing (clutch rolling bearing section)
90: sprag (engaging element)

The invention claimed is:

1. A power generation device comprising:
a main shaft rotated by an external force;
a speed-up gear comprising a rotation transmission mechanism that increases a speed of rotation of the main shaft, and an output gear that outputs the rotation increased in speed by the rotation transmission mechanism;
a high-speed shaft that is rotatable by receiving a rotational force of the output gear;
a rolling bearing that rotatably supports the high-speed shaft;
a power generator which comprises a drive shaft that rotates by receiving rotation of the high-speed shaft and a rotor that rotates integrally with the drive shaft, and which generates electric power in accordance with rotation of the rotor; and
a one-way clutch which is disposed between the output gear and the high-speed shaft, and in a state where the main shaft is rotating in a positive direction, integrally rotatably connects the output gear and the high-speed shaft to each other if a rotational speed of the output gear exceeds a rotational speed of the high-speed shaft, and breaks connection between the output gear and the high-speed shaft if the rotational speed of the output gear becomes lower than the rotational speed of the high-speed shaft.

2. The power generation device according to claim 1,
wherein the output gear is a ring-shaped gear which is provided coaxially with the high-speed shaft on an outer circumferential side of the high-speed shaft such that the one-way clutch is sandwiched by the ring gear and the high-speed shaft, and
wherein the one-way clutch comprises a first clutch section provided on an inner circumferential side of the output gear and rotating integrally with the output gear, a second clutch section rotating integrally with the high-speed shaft, and an engaging element disposed between the first clutch section and the second clutch section.

3. The power generation device according to claim 2,
wherein the one-way clutch further comprises a clutch rolling bearing section that relatively rotatably supports the first clutch section and the second clutch section.

4. The power generation device according to claim 3,
wherein the clutch rolling bearing section comprises an outer ring portion, an inner ring portion and a cylindrical roller that is disposed between the outer ring portion and the inner ring portion and that rolls on an inner circumferential surface of the outer ring portion and an outer circumferential surface of the inner ring portion, and
wherein the first clutch section and the second clutch section are relatively movable along an axial direction.

5. A power generation device comprising:
a main shaft rotated by an external force;
a speed-up gear comprising a rotation transmission mechanism that increases a speed of rotation of the main shaft, and an output gear that outputs the rotation increased in speed by the rotation transmission mechanism;
a high-speed shaft that is rotatable by receiving a rotational force of the output gear;
a rolling bearing that rotatably supports the high-speed shaft; and
a power generator which comprises a drive shaft that rotates by receiving rotation of the high-speed shaft and a rotor that rotates integrally with the drive shaft, and which generates electric power in accordance with rotation of the rotor,
wherein the high-speed shaft comprises a first shaft section that rotates integrally with the output gear, a second shaft section supported by the rolling bearing, and a connecting section provided between the first shaft section and the second shaft section, and
wherein the connecting section is a one-way clutch, and in a state where the main shaft is rotating in a positive direction, the one-way clutch integrally rotatably connects the first shaft section and the second shaft section to each other if a rotational speed of the first shaft section exceeds a rotational speed of the second shaft section, and breaks connection between the first shaft section and the second shaft section if the rotational speed of the first shaft section becomes lower than the rotational speed of the second shaft section.

6. The power generation device according to claim 5,
wherein one of the first shaft section and the second shaft section comprises a cylindrical portion located at a shaft end thereof, and the other of the first shaft section and the second shaft section comprises a center shaft portion located at a shaft end thereof and disposed on a radially inner circumferential side of the cylindrical portion, and
wherein the one-way clutch comprises a first clutch section that is provided inside the cylindrical portion and that rotates integrally with the cylindrical portion, a second clutch section that rotates integrally with the center shaft portion, and an engaging element provided between the first clutch section and the second clutch section.

7. The power generation device according to claim 6,
wherein the one-way clutch further comprises a clutch rolling bearing section that relatively rotatably supports the first clutch section and the second clutch section.

8. The power generation device according to claim 7,
wherein the clutch rolling bearing section comprises an outer ring portion, an inner ring portion and a cylindrical roller that is disposed between the outer ring portion and the inner ring portion and that rolls on an inner circumferential surface of the outer ring portion and an outer circumferential surface of the inner ring portion, and
wherein the first clutch section and the second clutch section are relatively movable along an axial direction.

9. The power generation device according to claim 6, wherein relative movement of the first clutch section and the second clutch section along an axial direction is allowed, and a maximum allowable amount of the relative movement is set to be larger than amounts of movement along the axial direction of the first shaft section and the second shaft section.

10. A rotating portion support structure for a power generation device, the power generation device comprising:

a speed-up gear comprising a rotation transmission mechanism that increases a speed of rotation of a main shaft rotated by an external force, and an output gear that outputs the rotation increased in speed by the rotation transmission mechanism; and a power generator which comprises a drive shaft that rotates by receiving an output from the speed-up gear and a rotor that rotates integrally with the drive shaft, and which generates electric power in accordance with rotation of the rotor, said rotating portion support structure comprising:

a high-speed shaft that is rotatable by receiving a rotational force of the output gear and that transmits the rotational force to the drive shaft;

a rolling bearing that rotatably supports the high-speed shaft; and a one-way clutch that is provided between the output gear and the high-speed shaft, and in a state where the main shaft is rotating in a positive direction, integrally rotatably connects the output gear and the high-speed shaft to each other if a rotational speed of the output gear exceeds a rotational speed of the high-speed shaft, and breaks connection between the output gear and the high-speed shaft if the rotational speed of the output gear becomes lower than the rotational speed of the high-speed shaft.

11. A rotating portion support structure for a power generation device, the power generation device comprising:

a speed-up gear comprising a rotation transmission mechanism that increases a speed of rotation of a main shaft rotated by an external force, and an output gear that outputs the rotation increased in speed by the rotation transmission mechanism; and a power generator which comprises a drive shaft that rotates by receiving an output from the speed-up gear and a rotor that rotates integrally with the drive shaft, and which generates electric power in accordance with rotation of the rotor, said rotating portion support structure comprising:

a high-speed shaft that is rotatable by receiving a rotational force of the output gear and that transmits the rotational force to the drive shaft; and a rolling bearing that rotatably supports the high-speed shaft, wherein the high-speed shaft comprises a first shaft section that rotates integrally with the output gear, a second shaft section supported by the rolling bearing, and a connecting section provided between the first shaft section and the second shaft section, and wherein the connecting section is a one-way clutch, and in a state where the main shaft is rotating in a positive direction, the one-way clutch integrally rotatably connects the first shaft section and the second shaft section to each other if a rotational speed of the first shaft section exceeds a rotational speed of the second shaft section, and breaks connection between the first shaft section and the second shaft section if the rotational speed of the first shaft section becomes lower than the rotational speed of the second shaft section.

\* \* \* \* \*